May 8, 1956 R. E. MOSHER ET AL 2,744,442
APPARATUS FOR STEREOSCOPIC PROJECTION IN AERIAL MAPPING
Filed Oct. 29, 1954 2 Sheets-Sheet 2

INVENTOR
Ralph E. Mosher
Robert A. Stiveson
BY Christy, Parmelee & Strickland

United States Patent Office 2,744,442
Patented May 8, 1956

2,744,442

APPARATUS FOR STEREOSCOPIC PROJECTION IN AERIAL MAPPING

Ralph E. Mosher, Pittsburgh, and Robert A. Stiveson, Latrobe, Pa., assignors to Robert A. Cummings, Jr., Pittsburgh, Pa.

Application October 29, 1954, Serial No. 465,526

4 Claims. (Cl. 88—24)

This invention relates to photogrammetry whereby a pair of standard size dispositive photographic plates taken from an aeroplane are projected onto drawing paper for map making purposes. More specifically the present invention is concerned with new and improved apparatus for use in map making, especially contour maps from aerial photographs.

An object of the invention is to provide improved apparatus for translating aerial photographs into contour maps wherein the setting and resetting of the light source for rechecking monuments, base lines and bench marks used as datum points in adjacent photographs is facilitated.

Our invention is an improvement upon prior art apparatus used for similar purposes as disclosed in Patents 2,451,031 and 2,492,870 to Kelsh to which reference may be made for a more detailed disclosure of the process of stereoscopic projection map making.

The foregoing process may be briefly described as adjustably mounting a pair of projectors upon a suitable stand for projecting images from a pair of consecutive slides or pictures on a screen. Light filtering devices such as complementary color filters are so arranged that the superimposed images may be viewed through glasses colored to match the color filters to show a stereoscopic model, so that drawing paper may be placed on the map table and the model cast on the screen of a standard moveable plotting table and topographic and planimetric maps drawn in the usual manner. The parts are so constructed and arranged, especially as to adjustment, that a model of the degree of fineness required for work of this kind is obtained.

Apparatus for this purpose as found in the prior art, utilizes a pair of projectors mounted side by side and a pair of overlapping consecutive films are used to project the model. After the field covered by such films are mapped, a new pair are inserted in the projectors showing additional areas to be mapped and the mapping proceeds. Frequently it is necessary to re-check monuments, base lines and bench marks shown on films covering adjacent areas and to do this the previously used films must be remounted in the projectors and the projectors laboriously reset in the exact position in which they were used while viewing a particular pair of pictures.

In our improved apparatus we mount a series of projectors upon a suitable support and mount in the projectors a series of negatives which cover the entire area to be mapped. The film in any one projector is paired with the picture on the film on either side of it thereby obviating the necessity for removing the films from two heads and mounting two new films in their place in order to proceed with a series of pictures. An additional advantage in such continuous pairing of a plurality of pictures is that it makes for quick and accurate referral to previously used views for checking monuments, etc. To obtain this quick and accurate referral, a novel linkage between the projector head and the arm which is attached to the plotting table is provided. By this means the projector head and its supporting arm may be shifted to the right or left and adjusted by a locking stop to pair with an adjacent projector head. Once so adjusted the projector head may always be returned to the correct position for use with the projector head to which it was previously paired.

Referring now to the drawings Fig. 1 shows in elevation a plurality of projectors mounted in series and equipped with the novel linkage connecting the projector head with the plotting table arm;

Figure 1:
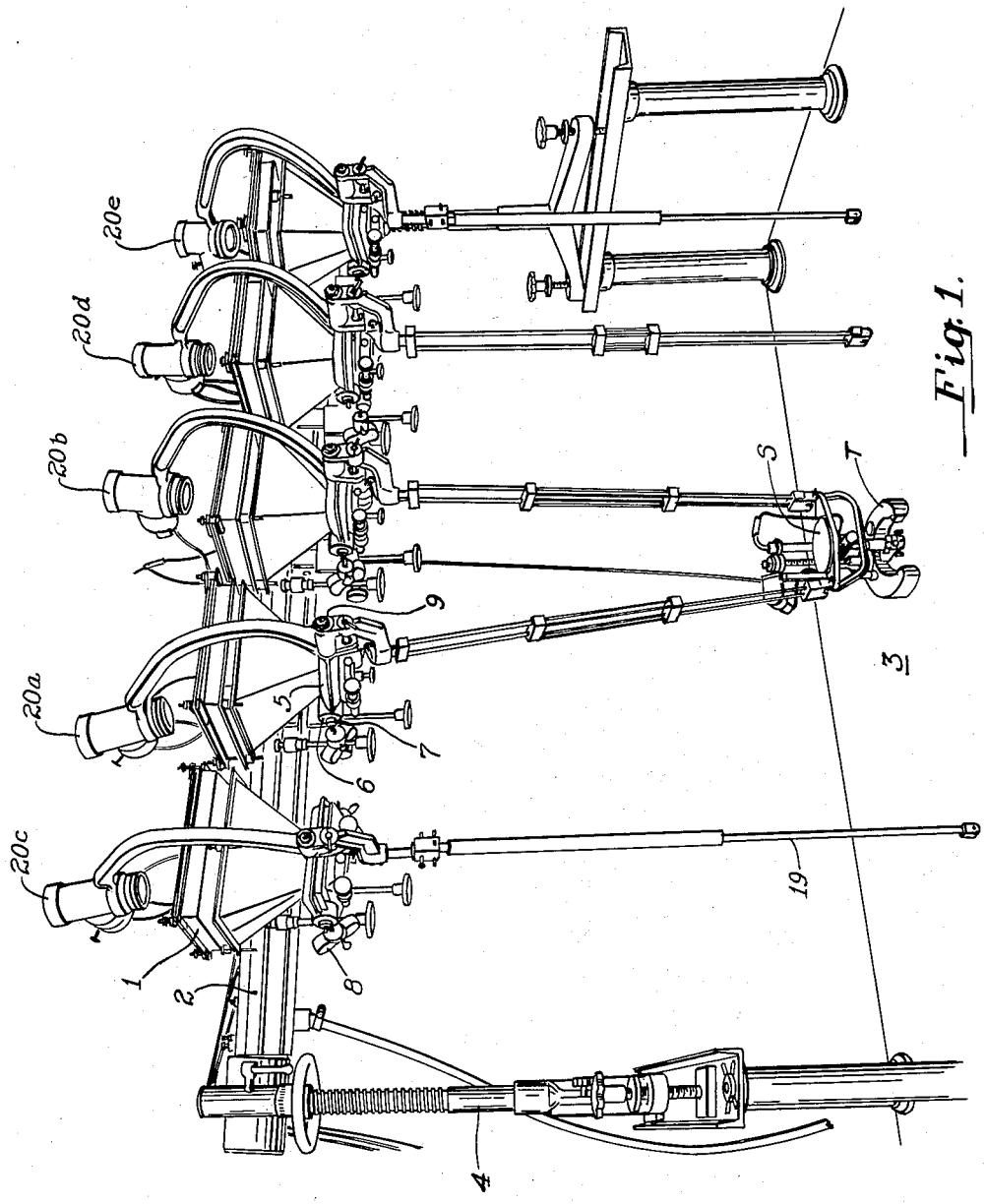
Figure 2:
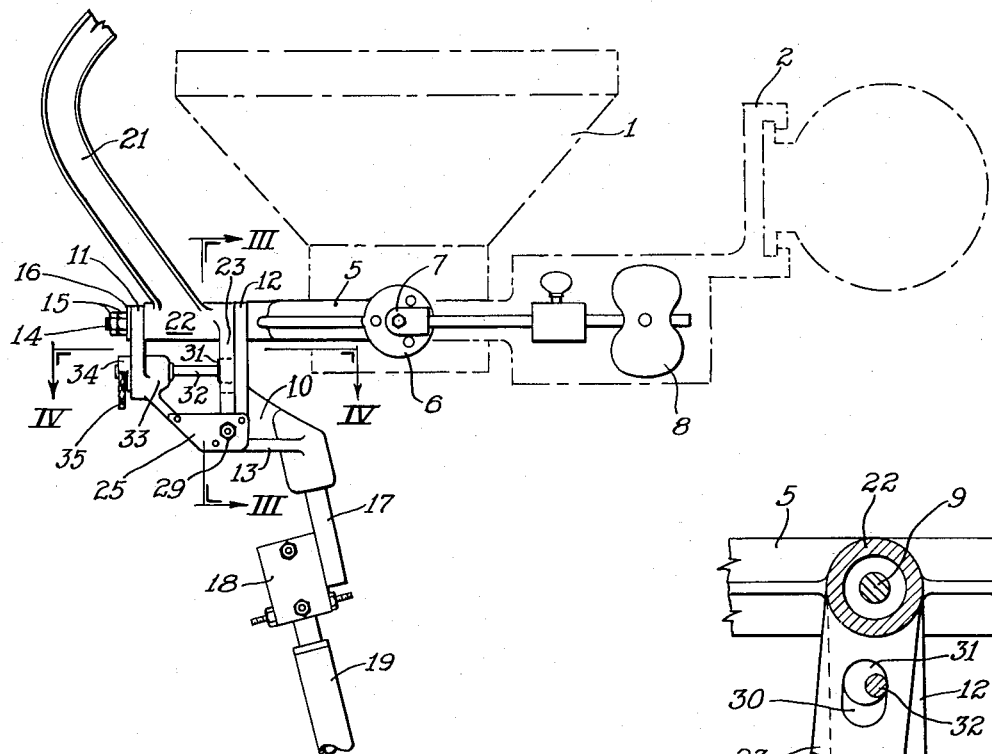
Fig. 2 shows an enlarged side elevation of the novel linkage.

In the drawings, a plurality of projectors 1 are adjustably mounted upon the bar 2 extending longitudinally above a plotting table 3 upon suitable supports 4 disposed at opposite ends of the plotting table. The projectors 1 form no part of the present invention and may be of any suitable design. Mounted upon the base of each projector 1 is a substantially U-shaped bracket 5 having the free ends of the bracket arms 6 engaging trunnions 7 secured to the projector. Suitable counterweights 8 balance the weight of the projector head, supporting bracket, and plotting table arm, hereinafter described, so that bracket 5 pivots in a vertical plane only upon movement of the plotting table.

Extending outward from bracket 5 is a trunnion 9. Pivotally mounted upon trunnion 9 is a projector head and plotting table arm supporting bracket 10 comprising spaced upwardly extending arms 11 and 12 connected by a base portion 13 which extends rearwardly beyond the arm 12. Adjacent the upper ends of the arms 11 and 12 are suitable openings for reception of the trunnion 9. Trunnion 9 has a threaded extension 14 projecting through arm 11 and upon which are mounted suitable lock nuts 15 and washer 16 for pivotally securing the bracket 10 upon the trunnion. Adjacent the rear end of bracket base 13 is mounted a depending arm 17 having a suitable clamp 18 for engagement with one end of the plotting table arm 19. The opposite end of arm 19 being detachably connected with a standard plotting table T having the screen S thereon.

The projector head 20 which includes the usual lamp and a plurality of lenses (not shown) is mounted at one end of an arm 21 which has at its opposite end a bearing hub 22 through which extends the trunnion 9 of bracket 5. The bearing hub 22 is thus pivotally mounted upon trunnion 9 between the arms 11 and 12 of the bracket 10 and is provided with a depending arm 23 having a reduced end portion 24 which extends downwardly between the stop plates 25 and 26 secured to the bracket 10 by means of the fastening members 27. Mounted on each stop plate 25 and 26, in alignment with the arc of movement of portion 24 of arm 23, are adjustable stop members 28 having locking means 29. Arm 23 is provided with a suitable opening 30 within which is mounted an operating and locking cam 31. Cam 31 is mounted on shaft 32 journaled in a hub 33 mounted on an inner face of the arm 11 of bracket 10. The shaft 32 extends through the arm 11 and has mounted on the extension an operating handle of any suitable design such as the member 34 having the member 35 extending outwardly therefrom.

When setting up the apparatus herein described, projectors 1 of the required number are mounted on the bar 2 and a suitable picture (not shown) is detachably mounted on the top of each projector. The height of bar 2 above table 3 and the angularity of each projector 1 are adjustable in the usual manner to project a suitable image from the picture upon the plotting table screen "S." This adjustable setting and focusing of the projector picture image forms no part of our invention and is well known in the prior art.

Figure 3:
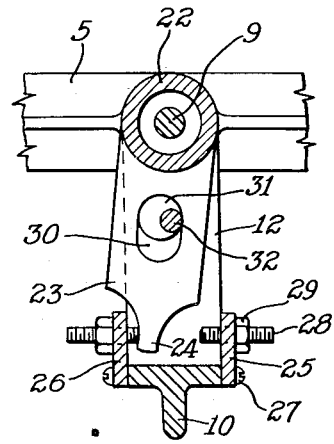
Fig. 3 shows a section taken on lines III—III of Fig. 2.
Figure 4:
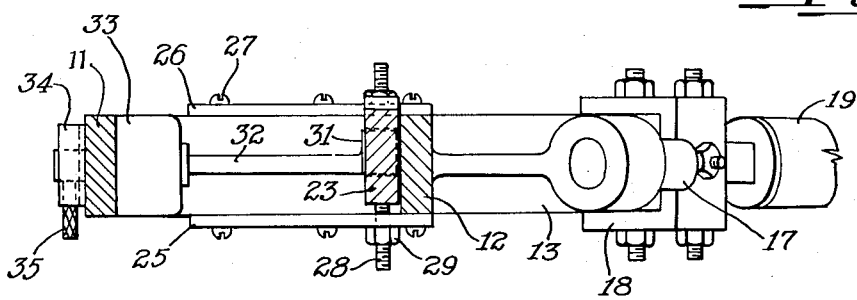
Fig. 4 shows a section taken on lines IV—IV of Fig. 2.

The pictures in the adjacent projectors are paired so as to produce the desired stereoscopic effect. The plotting table arms 19 of two adjacent projector heads 20a and 20b are connected with the plotting table "T" as shown in Fig. 1. Projector heads 20a and 20b of these adjacent projectors are then focused on the plotting table screen "S" by means of handle 35 turning cam 31 to rotate the associated projector head on its supporting arm 21 as shown in Figs. 3 and 4. During this adjustment of the arm 21, the cam 31 permits selective adjustment of the arm in one direction but prevents gravitational movement of the arm in the opposite direction due to the characteristic of a cam to transmit force to its associated member 23 but not to transmit force from the member to the cam shaft 32. After the projector heads 20a is suitably focused, stop member 28 of stop plate 25 is advanced to engage the end portion 24 of the arm 23 and is locked in position by the nut 29. Similarly the head 20b is locked in position by the stop member 28 in stop plate 26 of its associated bracket 10.

The projector heads 20c and 20a may then be connected with the plotting table "T" and suitably focused upon the screen "S" of the plotting table. These heads may now be locked relative to their respective brackets 10 as hereinbefore described. Projector head 20a is common to the two pairings of heads 20c with 20a and 20a with 20b. When head 20a was paired with 20b the stop member 28 of stop plate 25 restricted further movement of the supporting arm 21 of head 20a in one direction. When head 20a was paired with 20c, the head 20a was moved to the opposite side of its associated projector so that stop member 28 of stop plate 26 was adjusted to lock the head in its extreme position to the left of its associated projector.

The advantage of such mounting of the respective projector heads will not be apparent. After the desired topographic map from pictures associated with head c and a has been plotted on the drawing, the head a and b are connected with the plotting table and the adjacent portions of the topographic map are plotted. This procedure may then be repeated by pairing heads b and d, then d and e until the desired mapping is completed. Whenever, as frequently occurs, it is desired to re-check a monument, base line or bench mark of the picture under an adjacent previously used head such as head 20c, the heads 20a and 20b may be disconnected from the plotting table and head 20a rotated to the right until its arm 23 engages stop 28 in stop plate 26. Head 20a is now paired with head 20c exactly as before and without further adjustment the plotting table arms may be reconnected with the plotting table and any desired checking performed. It will now be readily apparent that at any time during the mapping of any particular series of pictures the operator of the apparatus may refer back to any previously used picture for any purpose by merely returning the head 20 used therewith to the appropriate side of its associated projector and the head will be automatically held in its previously adjusted position by the stop member 28 and cam 31.

The exact details of construction of the apparatus were used for purposes of illustration only and not limitations. It is to be understood that we do not limit ourselves to such details of construction except where made necessary by the scope of the appended claims.

We claim:

1. Apparatus for stereoscopic projecting comprising a series of projectors mounted longitudinally of an adjustable supporting bar for reception of a series of pictures taken from an aeroplane, each said picture in the series after the first being a continuation of the preceeding picture, a bracket pivotally mounted on each projector for movement in a vertical plane, a second bracket trunnioned on each first named bracket for pivotal movement in a vertical plane at right angles to the plane of movement of the first bracket, a plurality of projectors heads a supporting arm pivotally mounted at its lower end of each said first named bracket trunnion within the associated second named bracket and having its upper end overlying the projector, a projector head being secured to the upper end of said supporting arm for directing light onto the picture in said associated projector, means on each said second named bracket for engagement with the projector head supporting arm for pivotally adjusting the associated second named bracket and projector head relative to the projector, and an arm depending from each said second named bracket for selective pivotal rotation of both brackets and associated projector head relative to the projector.

2. In a stereoscopic projection apparatus the combination of a series of longitudinally spaced projectors each having one of a series of picture films mounted thereon, each said picture in the series after the first being a continuation of the preceding picture, a projector head above each projector for projecting a small area of its associated projector picture upon a plotting table screen connected with such projector head and that of an adjacent projector, each said projector head being attached to the upper end of a supporting arm whose lower end is pivotally mounted within a bracket pivotally connected with the associated projector, means on each said bracket for pivoting the projector head supporting arm in focusing a light ray from the projector head upon a plotting table screen disposed below the projector, means adjustably mounted at each side of each said bracket for abutting engagement with the lower end of said supporting arm as it moves towards the respective side of the bracket for fixing maximum movement of the end of the said supporting arm towards said side during initial focusing of the projector head as it is adjusted to pair with a projector head at each side of its respective projector, and means connecting the paired projector heads with the plotting screen.

3. The combination as defined in claim 2 wherein the pivotal mounting for the light the lower end of said supporting arm comprises a trunnion shaft extending between opposite arms of the bracket and the said supporting arm rotates on the shaft.

4. The combination as defined in claim 3 wherein the said supporting arm has a portion depending below the said shaft and provided with an opening therein, the means for pivoting the supporting arm comprises a second shaft journaled in one of said bracket arms for extension beyond each side of the bracket arm, a cam mounted on one end of the shaft for engagement within the opening in the said supporting arm depending portion, and a member on the opposite end of the shaft for turning the shaft and cam within said depending portion opening for pivoting the said supporting arm and automatically locking the supporting arm in position after the cam shaft turning member is released.

References Cited in the file of this patent

UNITED STATES PATENTS

| | | |
|---|---|---|
| 1,980,657 | Bauersfeld | Nov. 13, 1934 |
| 2,085,498 | Horner | June 29, 1937 |
| 2,451,031 | Kelsh | Oct. 12, 1948 |
| 2,461,567 | Pennington | Feb. 15, 1949 |
| 2,492,870 | Kelsh | Dec. 27, 1949 |
| 2,552,975 | Kelsh | May 15, 1951 |
| 2,678,583 | Knapik | May 18, 1954 |